(12) United States Patent
Marty et al.

(10) Patent No.: US 8,073,579 B2
(45) Date of Patent: Dec. 6, 2011

(54) DEVICE AND METHOD FOR EXTRACTING TERRAIN ALTITUDES

(75) Inventors: Nicolas Marty, Saint Sauveur (FR); Julia Percier, Cugnaux (FR); Aurélie Sallier, Toulouse (FR)

(73) Assignee: Thales (FR)

( * ) Notice: Subject to any disclaimer, the term of this patent is extended or adjusted under 35 U.S.C. 154(b) by 711 days.

(21) Appl. No.: 12/118,129

(22) Filed: May 9, 2008

(65) Prior Publication Data

US 2009/0326741 A1    Dec. 31, 2009

(30) Foreign Application Priority Data

May 11, 2007   (FR) ...................... 07 03388

(51) Int. Cl.
*G05D 1/04* (2006.01)
*G06F 17/00* (2006.01)
(52) U.S. Cl. .......................... 701/4; 340/970
(58) Field of Classification Search .......... None
See application file for complete search history.

(56) References Cited

U.S. PATENT DOCUMENTS

| | | | | |
|---|---|---|---|---|
| 5,798,712 A | * | 8/1998 | Coquin | 340/970 |
| 6,421,603 B1 | | 7/2002 | Pratt et al. | |
| 6,643,580 B1 | * | 11/2003 | Naimer et al. | 701/206 |
| 6,710,723 B2 | | 3/2004 | Muller et al. | |
| 7,386,373 B1 | * | 6/2008 | Chen et al. | 701/9 |

FOREIGN PATENT DOCUMENTS

EP    0717330 A1    6/1996

* cited by examiner

*Primary Examiner* — Michael J. Zanelli
(74) *Attorney, Agent, or Firm* — Lowe Hauptman Ham & Berner, LLP

(57) ABSTRACT

The present invention relates to a method and a device for extracting terrain altitudes notably for a display of a sectional view of a terrain overflown by an aircraft. The device for extracting terrain altitudes along a trajectory of an aircraft in flight includes an interface taking into account selected flight parameters of the aircraft; a terrain altitudes extraction requests manager; a geographical zones manager; a terrain data manager; a terrain profile provider. The disclosed embodiment is configured to be used within the framework of an anticollision device for preventing collision between an aircraft and the terrain.

26 Claims, 10 Drawing Sheets

DEVICE AND METHOD FOR EXTRACTING TERRAIN ALTITUDES

RELATED APPLICATIONS

The present application is based on, and claims priority from, French Application Number 07 03388, filed May 11, 2007, the disclosure of which is hereby incorporated by reference herein in its entirety

BACKGROUND OF THE INVENTION

The present invention relates to a device and a method for extracting terrain altitudes notably for a display of a sectional view of a terrain overflown by an aircraft. The invention can notably be used within the framework of an anticollision device for preventing collision between an aircraft and the terrain.

DESCRIPTION OF THE PRIOR ART

With the objective of guaranteeing greater safety of aircraft in flight, systems such as TAWS, the initials standing for Terrain Awareness and Warning System, make it possible notably to warn a pilot of an aircraft of the imminence of a collision with the terrain. TAWS systems can have several modes of operation:
  a first mode, called the reactive mode, makes it possible on the basis of the current position of the aircraft, its speed and the terrain, to alert the pilot of the imminence of a collision between the aircraft and the terrain;
  a second mode, called the predictive mode makes it possible, as a function notably of the performance of the aircraft, to envisage a terrain avoidance manoeuvre in the event of risk of collision and to warn the pilot of the risk of collision;
  a third mode, is a terrain display mode that takes into account a danger criterion for the aircraft. This danger criterion, which can be for example a minimum safety altitude for the aircraft, makes it possible to highlight parts of a terrain that are dangerous for the aircraft.

These various modes of operation all use terrain data, that is to say a file describing for each position of a map, expressed in latitude and longitude for example, the altitude of the terrain at this position. These files cover notably the whole of the terrain under a complete trajectory of an aircraft. Their precision is very high: it is necessary for example to be able to discern very tall antennas so as to be able to avoid them if the aircraft flies in proximity to them. Such data occupy a great deal of room in a memory of an embedded computer onboard the aircraft. Moreover, utilization of the terrain data is very expensive in terms of calculation time for embedded-computer processors. Now, these systems must perform numerous calculations in real time With considerable precision in the results. Embedded computers are often limited in terms of calculation time and memory on account notably of the considerable amount of data to be processed in real time.

In order to guarantee excellent precision of the results of detecting collision between the terrain and the aircraft, the reactive and predictive modes of operation of TAWS process the terrain over short distances. These modes of operation therefore do not allow the pilot to anticipate avoidance manoeuvres. These avoidance manoeuvres are then carried out as a matter of urgency and therefore to the detriment of passenger comfort and with a risk of the manoeuvre failing if a technical problem arises at that moment.

As regards the terrain display mode, even though it performs presentation of the terrain over a large distance, this is to the detriment of the precision of the information taken into account.

SUMMARY OF THE INVENTION

An aim of the invention is notably to alleviate the aforesaid drawbacks. For this purpose, the subject of the invention is a first device for extracting terrain altitudes along a trajectory of an aircraft in flight.

The first device for extracting terrain altitudes comprises notably:
  a means for selecting flight parameters of the aircraft;
  a terrain altitudes extraction requests manager;
  a zones manager;
  a terrain data manager;
  a terrain profile provider.

The terrain altitudes extraction requests manager constructs, on request, a trajectory of the aircraft on the basis of the flight parameters selected.

The zones manager:
  formulates one or more geographical zones along the trajectory of the aircraft, the geographical zones covering the trajectory;
  corrects the terrain altitudes extracted on the basis of terrain altitudes originating from external systems;
  formulates a profile of maximum altitudes along the trajectory.

The terrain data manager:
  extracts terrain altitudes from a terrain database in the geographical zones formulated by the zones manager;
  determines terrain altitude maxima along the trajectory.

The terrain profile provider shapes a profile of the altitude maxima that is provided to external applications.

The terrain data manager can notably extract the terrain altitudes from a terrain altitude data map stored in the terrain database. The terrain altitude data map is for example split up into several cells. The cells are for example grouped into one or more slices of cells distributed along the trajectory.

The terrain data manager extracts notably terrain altitudes of each cell belonging to each zone and determines a maximum altitude per slice of cells.

The requests manager can take into account terrain altitude extraction requests coming from a user.

The requests manager can take into account terrain altitude extraction requests coming from an external system.

The requests manager deletes notably from the trajectory the portions of trajectories that are obsolete with respect to a current position of the aircraft along the trajectory.

The requests manager can use already calculated portions of profile of the altitude maxima.

The requests manager takes notably into account valid flight parameters to construct the trajectory.

The geographical zones constructed by the zones manager are for example of parallelepipedal form.

The geographical zones constructed by the zones manager are for example rectangular and centred on the trajectory.

The request manager constructs notably the trajectory on the basis of flight parameters present in a flight plan.

An external application can be a display.

An external application can be a function for verifying interference between the trajectory and the profile of the altitude maxima.

The request manager can construct the trajectory on the basis of a segment comprising for example an origin, an orientation and a length.

The present invention also relates to a method for extracting terrain altitudes along a trajectory of an aircraft in flight. The method comprises at least the following steps:
- selecting flight parameters;
- recovering the flight parameters selected;
- constructing the trajectory of the aircraft with the flight parameters selected;
- constructing one or more geographical zones along the trajectory of the aircraft, the geographical zones covering notably the trajectory;
- identifying cells of an altitude data map of the terrain belonging to each zone;
- extracting the altitudes of the terrain of the identified cells of a zone for each zone;
- grouping the identified cells belonging to a zone into several slices of cells;
- determining a maximum altitude per slice of cells;
- composing a profile of the determined altitude maxima along the trajectory.

The trajectory portions that are obsolete with respect to a current position of the aircraft can be deleted from the trajectory taken into account for the construction of geographical zones.

The already calculated portions of the profile of the altitude maxima are not, for example, recalculated following a modification of the trajectory.

It being possible for several trajectories to be taken into account by the method according to the invention, only the valid trajectories, for example, are taken into account.

The geographical zones are for example parallelepipeds.

The geographical zones are for example rectangles centred on the trajectory of the aircraft.

The trajectory can be constructed on the basis of flight parameters emanating from a flight plan.

The trajectory can be constructed on the basis of a segment defined by a position, an orientation and a length.

The profile of the altitude maxima can be displayed.

The profile of the altitude maxima can be provided to a function for verifying interference between the trajectory and the profile of the altitude maxima.

The profile of the altitude maxima can be corrected with altitude data emanating from one or more external systems.

The identification of the cells belonging to each zone uses for example the Bresenham algorithm.

The invention also pertains to a second device for extracting altitudes of the terrain along a trajectory of an aircraft in flight. The second device comprises:
- a constructor of geographical zones covering the trajectory;
- a manager of terrain data cells of a terrain altitude data map. The terrain data altitude map for example divided into terrain data cells each comprises an altitude. The manager of terrain data cells identifies notably the terrain data cells belonging to each zone and determines a maximum altitude per slice of terrain data cells;
- a terrain data extractor, recovering the altitudes of the cells identified in a terrain database comprising terrain altitude data maps;
- a terrain data consolidation module, making the maximum altitudes consistent with altitude data emanating from an external system;
- a sliding filter, identifying the trajectory portions already traversed by the aircraft and which are no longer to be taken into account to construct the geographical zones;
- a calculated-data manager, eliminating the trajectory portions already taken into account in a zone.

The main advantages of the invention are notably that it gives precise and robust results, while optimizing the calculation times.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF A PREFERRED EMBODIMENT

Figure 1A:
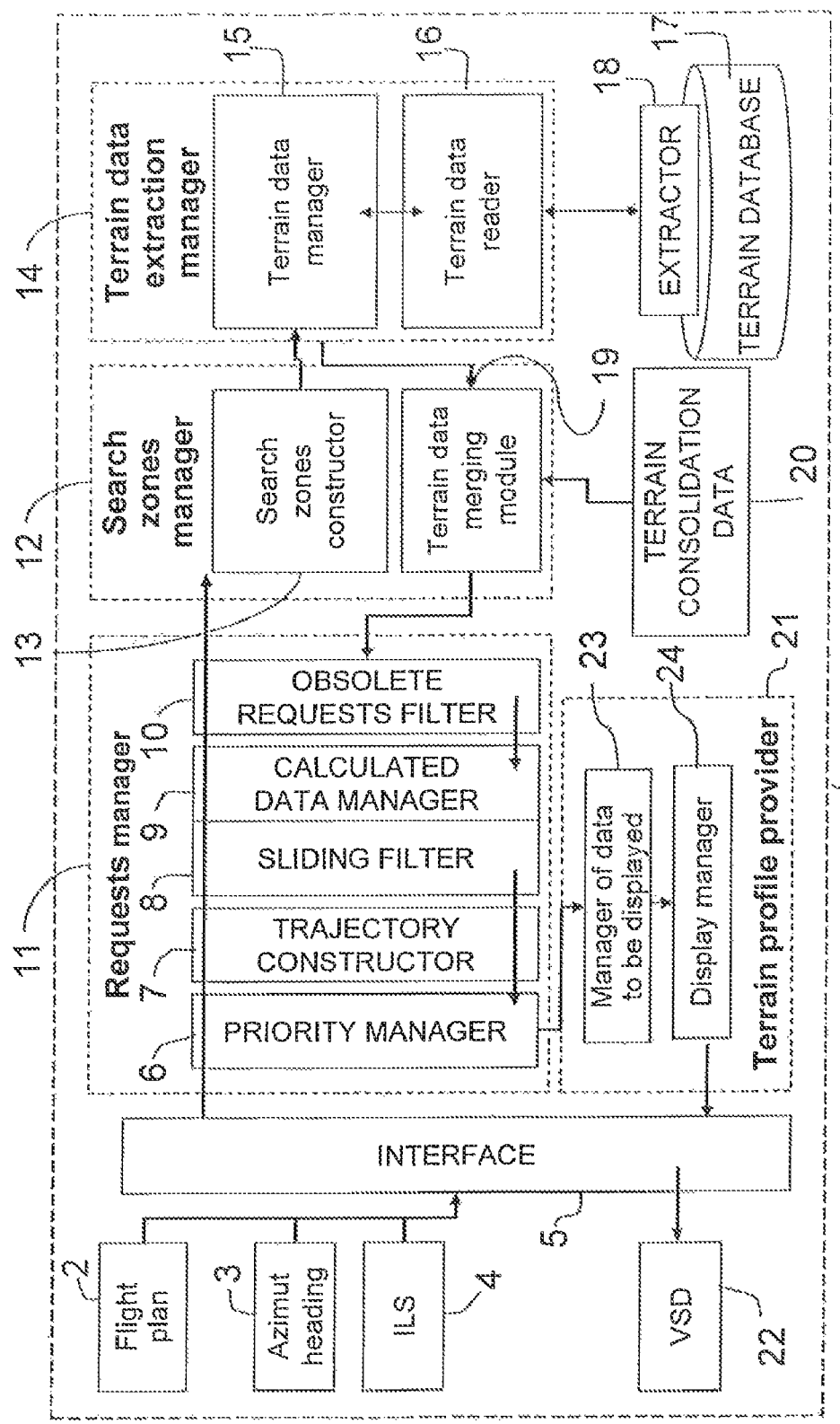
FIG. 1a: a diagram of a device for extracting terrain altitudes according to the invention.

FIG. 1a represents an example of an architecture of a device for extracting terrain altitudes 1 according to the invention.

The device for extracting terrain altitudes 1 can be used notably aboard an aircraft to supplement a TAWS system for example. It can make it possible to display on a screen a view of a terrain profile along a trajectory of an aircraft. A trajectory of an aircraft can emanate from position, altitude and heading data forming part notably of a flight plan of the aircraft. A trajectory can be represented for example in the form of a succession of points linked by segments. The display of the trajectory with a profile of the terrain overflown can allow a pilot of the aircraft, for example, to ascertain the position of the aircraft with respect to the ground over the whole of the trajectory or over a part of the trajectory, over a given temporal horizon for example. The pilot can thus possibly anticipate terrain avoidance manoeuvres in the event of too close proximity of the trajectory and terrain.

The device for extracting terrain altitudes 1 can take into account aircraft flight parameters arising for example from a flight plan 2 so as to construct a trajectory of the aircraft. An aircraft's flight parameters are data describing an aircraft's flight phase. These data describing a flight phase are notably a speed of the aircraft, a direction and an altitude. Several types of flight plan 2 can be taken into account by the device for extracting terrain altitudes 1:

- a main flight plan;
- a secondary flight plan, corresponding for example to an alternative to the main flight plan;
- a temporary flight plan notably if the main flight plan is undergoing modification by the pilot.

Other types of flight parameters can also be taken into account by the device for extracting altitudes 1:

- an orientation 3 such as a heading or an azimuth;
- ILS data 4, the initials standing for Information Landing System, that may comprise data forming part of an airport approach or airport runway landing procedure for example.

The flight parameters taken into account must be valid, that is to say they must not be obsolete, as a modified flight plan might for example be.

Generally, the various flight parameters 2, 3, 4 taken into account by the device for extracting terrain altitudes 1 can correspond to a flight plan or to a segment.

The segment can notably be defined by an origin position, an orientation and a length.

The origin position of the segment can be for example the current position of the aircraft provided by a GPS system, the initials standing for Global Positioning System. The orientation of the segment can in this case be the current heading of the aircraft provided notably by a GPS. The orientation of the segment can also be an azimuth selected by a pilot of the aircraft with the aid for example of a dedicated Man Machine Interface, or MMI.

The origin position of the segment can also be a landing or takeoff runway, the orientation of the segment then being the direction of the axis of the runway.

Other types of origin positions can be taken into account such as a point designated by the pilot of the aircraft on a dedicated MMI, the designated point being associated with an azimuth also selected by the pilot via the MMI.

The pilot can also select a particular point on a trajectory of the aircraft. The orientation is then the direction of the trajectory at this designated point.

The length of the segment can be chosen by the pilot via a dedicated MMI or defined by a default value.

The various data describing the flight parameters, presented above, can be taken into account by the device for extracting altitudes 1 by way of an interface 5. The interface 5 is notably charged with recovering the various flight parameters making it possible to construct a trajectory as a function of other information such as the following or non-following of a flight plan by the aircraft. The interface 5 can therefore take into account criteria allowing it to select the appropriate flight parameters in order to construct a trajectory of the aircraft.

For example, when the aircraft does not follow a flight plan, the interface 5 can use the current position of the aircraft as well as its current heading to construct a trajectory of the aircraft. This trajectory is constructed in the form of a segment such as defined previously.

When the aircraft follows a flight plan, the pilot can select a point or an azimuth of the aircraft trajectory described in the flight plan followed so as to perform an extraction of terrain altitudes along a trajectory portion comprising the point or oriented along the azimuth.

The various types of flight parameters can be taken into account with different priorities. For example a main flight plan can have a higher priority than a secondary flight plan, which itself has priority over a temporary flight plan. The other types of flight parameters can have a still lower degree of priority. The priorities are notably taken into account and managed by a priority manager 6. The various choices expressed by the pilot by way of a Man Machine Interface, not represented in FIG. 1*a*, are taken into account by the device for extracting altitudes 1 in the form of requests. Requests can also originate from an external system. The priority manager 6 makes it possible to manage the priorities between the various requests and to establish a schedule for processing these requests. A schedule for processing the requests can take the form of a list of tasks to be performed. The list of tasks can be ordered in such a way that the first task requested is the first task performed, while taking into account the priorities between the various tasks.

Thereafter, each request is taken into account by a trajectory constructor 7 which, on the basis of the various flight parameters, constructs a trajectory for example in the form of a succession of points linked by segments or circular arcs.

The terrain altitudes extracted for a trajectory are reupdated as a function notably of the forward progress of the aircraft over the trajectory.

Each request passes through a series of filters 8, 9, 10 aimed at precluding needless processing.

For example, during the forward progress of the aircraft over a trajectory a first sliding filter 8 can perform a comparison of the altitudes already extracted for this trajectory and ask that only the missing altitudes be extracted.

If the trajectory has been modified, a second filter called the manager of the calculated data 9 performs a comparison of a new trajectory with an old trajectory so as to extract the altitudes only for the different trajectory parts between the old trajectory and the new trajectory.

A third filter 10 makes it possible to preclude the processing of obsolete requests. This third filter 10, called the obsolete requests filter 10, makes it possible for example to delete unperformed tasks relating to obsolete trajectory data for example. Only the non-obsolete trajectories, that is to say those that are valid, are then taken into account. Unperformed tasks may indeed persist in the task list to be performed when they have a low processing priority with respect to other tasks of the list. Therefore, they may not have been processed before becoming obsolete. It is therefore advisable to regularly delete any obsolete task so as not to perform needless processing.

The priority manager 6, the trajectory constructor 7 as well as the series of filters 8, 9, 10 can form part of a requests manager 11 which makes it possible notably to define the trajectory parts over which the requested extraction of altitudes is applied.

The trajectory parts to be processed having been identified by the requests manager 11, a search zones manager 12 can notably deal with the construction of search zones. A search zone is a geographical zone of a given dimension comprising a part of the trajectory. The whole of the trajectory can be included in one or more search zones. A search zone therefore makes it possible to define a geographical zone in which the terrain altitudes are extracted. The search zones are constructed by a search zones constructor 13. The construction of the search zones is described more precisely subsequently.

Once the search zones have been constructed, a terrain data extraction manager 14 deals with the extraction of the altitudes of the terrain included in the search zones. The management of the extraction of the terrain data uses notably a terrain data manager 15. The terrain data can take the form of a map split up into cells, each cell corresponding to a terrain portion. With each cell is associated an altitude, which can be the mean altitude of the terrain over this cell. The terrain data manager 15 makes it possible notably to identify the terrain data cells included in each search zone. The identification of the terrain data cells of a search zone is described in greater detail subsequently.

For each cell identified by the terrain data manager 15, the latter requests a terrain data reader 16 for the values of the altitudes of the identified terrain data cells. The terrain data reader 16 can interrogate its own altitude database initially. If the altitudes requested are not in its altitude database then it interrogates a terrain database 17 by way of an extractor 18. The extractor 18 extracts the altitudes of the terrain data cells requested. The extracted altitudes can thereafter be stored in a buffer memory, not represented in FIG. 1a, by the terrain data reader 16 for subsequent use. The size of the data placed in memory by the terrain data reader 16 can be limited to a given maximum size. This maximum size is a size allowing faster access to the altitudes when the terrain data reader 16 interrogates the terrain database 17.

Once the altitude of each identified cell has been recovered, the terrain data manager 15 performs a search for the maximum altitudes of the search zone. The method of searching for the maximum altitudes of the search zone is described in greater detail subsequently.

The maximum altitudes are thereafter communicated to a terrain data consolidation module 19 forming part of the search zones manager 12 for example. The terrain data consolidation module 19 performs a reconstitution of the trajectory as well as a reconstitution of a ridge line in each search zone joining the extracted maximum altitudes. A ridge line is thus obtained representing a terrain profile generated according to the plot of the trajectory. The terrain data consolidation module 19 can take account of terrain profile consolidation data 20 emanating from systems external to the device for extracting terrain altitudes 1. The terrain profile consolidation data 20 can be for example:
- a terrain profile emanating from a TAWS system;
- airport data arising for example from a navigation database;
- an altitude for resetting the altitudes of the terrain profile generated, the resetting altitude arising for example from a TAWS system.

The terrain profile 20 coming from the TAWS system may or may not be taken into account according to a degree of emergency of an alert raised by the TAWS or according to alert conditions. The terrain profile 20 is used to consolidate the terrain profile generated. This consolidation makes it possible notably to make the terrain profile altitudes emanating from the TAWS 20 consistent with the altitudes of the terrain profile generated.

The airport data allow local correction of terrain profile altitudes generated with altitudes of the airports. For example, around a landing runway having a high probability of being the aircraft's arrival runway, the altitudes of the terrain profile around this runway are corrected with the altitude of the runway concerned. Thus, the terrain profile does not take into account a mountain possibly situated in proximity to the runway and that could disturb the representation and the interpretation of the terrain profile by the pilot.

Thereafter the various filters 10, 9, 8 take the data calculated into account to update their filtering criteria.

The ridge line is thereafter transferred to the priority manager 6 so that it matches the calculated data with the requests made. The priority manager thereafter communicates the calculated data to a terrain profile provider 21 which can for example manage the display of the ridge line, also named terrain profile, on a display 22 or VSD 22 the initials standing for Visual System Display. The terrain profile provider 21 comprises for example a manager of data to be displayed 23. The manager of the data to be displayed 23 can notably periodically perform a translation of the terrain profile displayed so as to follow the movements of the aircraft. This makes it possible to display only the forthcoming terrain profile for example. The manager of the data to be displayed 23 can also perform coordinate conversions of the profile into a curvilinear abscissa for example, according to a format specific to the display. Generally, the terrain profile provider 21 performs a shaping of the terrain profile so as to provide the latter to external applications, other than a VSD, that may notably use it in their processing. This shaping can be a selecting of the parameters appertaining to the external application or a data format conversion for example.

Once the terrain profile has been put into a display format, the latter is dealt with by a manager of the display 24 which periodically dispatches the data to be displayed to the VSD 22 and which implements notably a protocol for exchanging information with the VSD 22. The data to be displayed thereafter pass through the interface 5 charged with providing the data to be displayed, notably to the VSD 22.

In another realization of the device for extracting terrain altitudes 1, the terrain profile provider 21 can also provide the terrain profile to a function for verifying interferences between the trajectory and the terrain profile provided. The function for verifying interferences can replace or be added to the VSD 22 in the device for extracting terrain altitudes 1.

The device for extracting terrain altitudes 1 can also make it possible to construct profiles of safety altitudes. A safety altitude is an altitude published by the civil aviation organization making it possible to guarantee the safety of the aircraft with respect to the terrain. These safety altitudes can be stored in a database of safety altitudes. Access to the altitudes of this database of safety altitudes can be had directly, that is to say without identifying terrain data cells, according to a method well known elsewhere.

Figure 1B:
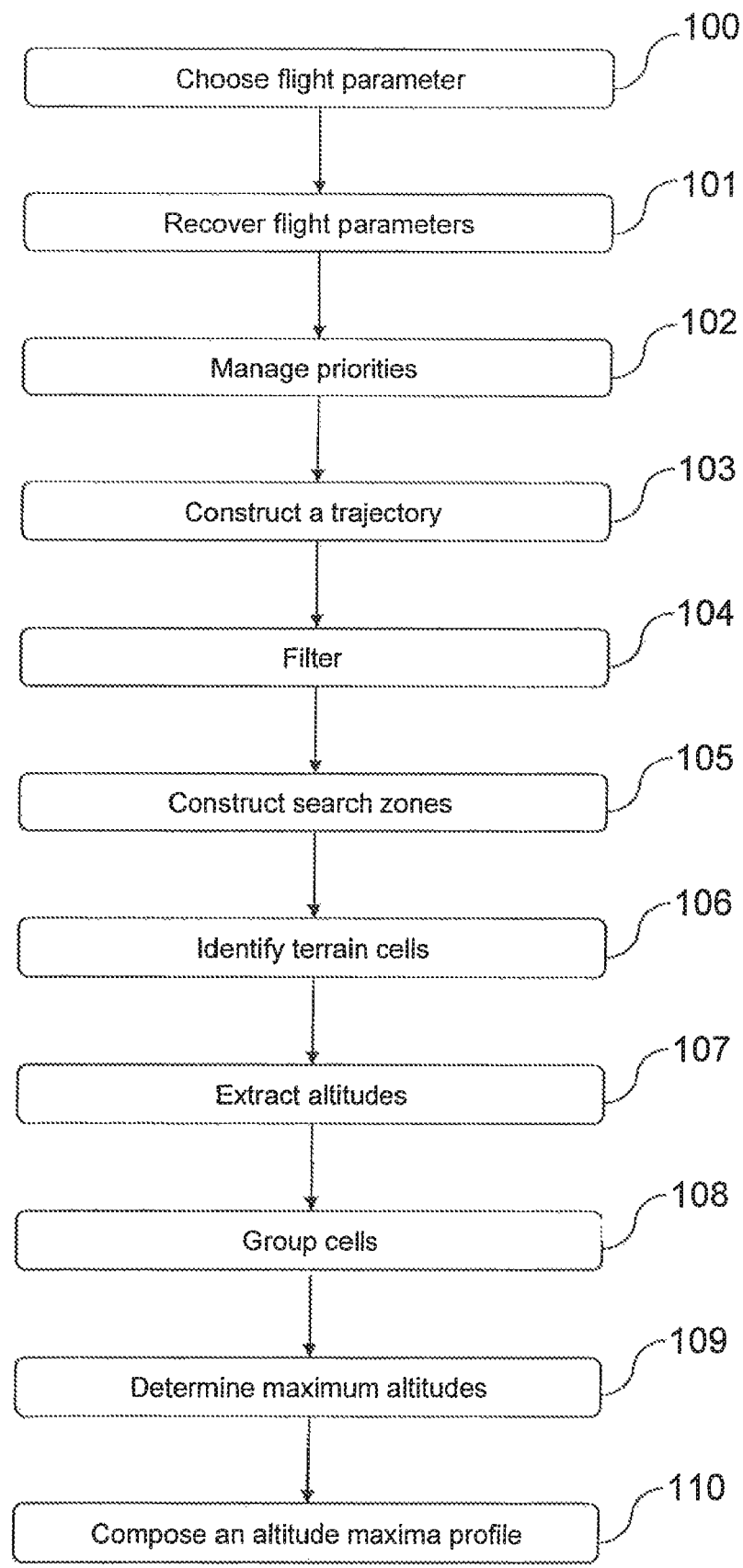
FIG. 1b: an example of steps of a method for extracting terrain altitudes according to the invention.

FIG. 1b represents various possible steps of the method according to the invention for extracting terrain altitudes. This method is for example implemented by the device for extracting terrain altitudes 1 according to the invention and represented in FIG. 1a.

A first step 100 is for example the choosing by the pilot or by an external system of the flight parameters 2, 3, 4 to be taken into account by the device for extracting terrain altitudes 1. The choosing of the flight parameters 2, 3, 4 can be done by another device using notably the device for extracting terrain altitudes 1 so as to obtain the altitudes of the terrain along the trajectory.

A second step 101 can be a recovery of the flight parameters 2, 3, 4, describing progress of the aircraft, chosen in the course of the first step 100. The flight parameters 2, 3, 4 can thereafter be selected according to criteria such as the fact that the aircraft is or is not following its flight plan. In the case where the aircraft does not follow its flight plan, the flight parameters used will preferably not be those described in a flight plan.

A third step 102 is for example a management of priority between various trajectories to be processed, that are chosen beforehand by the pilot. The various types of trajectories that can be processed can have different processing priorities.

A fourth step 103 makes it possible to construct a trajectory having a format determined on the basis of the flight parameters recovered. The trajectory format determined can take for example the form of a series of points linked by segments or circular arcs.

A fifth step 104 can make it possible to perform filtering operations. These filtering operations make it possible notably not to re-extract altitudes for already processed trajectory portions. These filtering operations also make it possible to ignore trajectory portions that have become obsolete on account of the forward progress of the aircraft along the trajectory, for example, or else on account of a modification of the trajectory.

A sixth step 105 allows the construction of search zones for maximum altitudes about the trajectory.

A seventh step 106 is for example the identification of terrain data cells belonging to each search zone. A terrain data cell being a part of a terrain altitude data map. The terrain altitude data map being for example split up into square cells.

An eighth step 107 makes it possible to extract altitudes of the terrain data cells identified as belonging to a search zone.

A ninth step 108 can make it possible to group the terrain data cells into slices of cells.

A tenth step 109 can make it possible to determine for each cell slice a maximum altitude from among all the altitudes extracted from the terrain data cells belonging to a given slice.

An eleventh step 110 can make it possible to compose a profile of the altitude maxima obtained per slice of terrain data cells. This profile of altitude maxima is for example a line of ridges along the trajectory.

Figure 2:
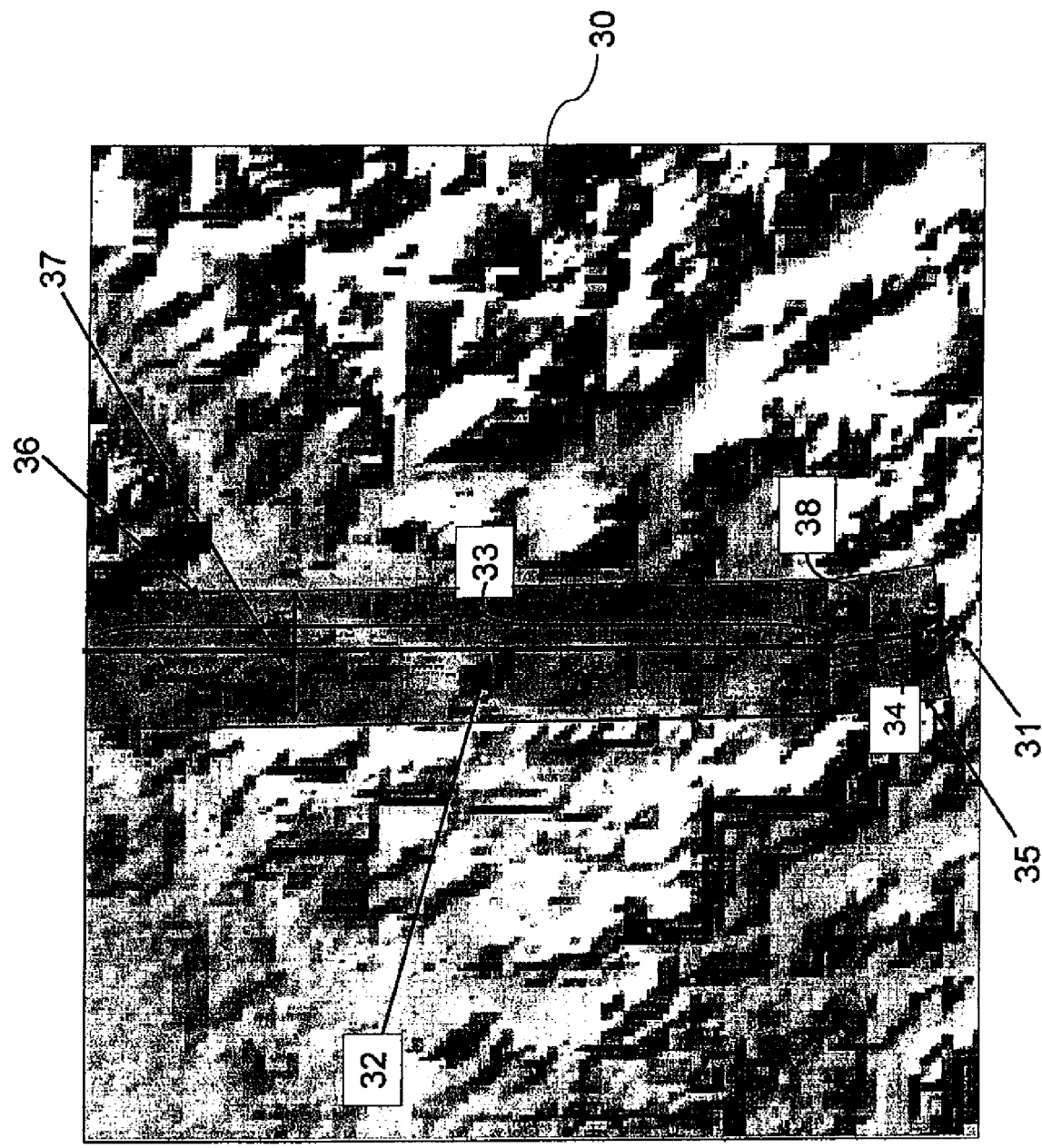
FIG. 2: an example of a map of terrain altitudes.

FIG. 2 represents an example of terrain altitude data to be extracted. Represented in FIG. 2 is a terrain altitude data map 30 split up into square cells for example. In FIG. 2 each cell can possess a hue relating to a mean altitude of the terrain of the cell for example. An aircraft 31 follows for example a first trajectory 32. The trajectory 32 is represented in a view from above or in a lateral profile in FIG. 2. The first trajectory 32 comprises notably two segments 33, 34 having a common end 38. The common end 38 can be for example a waypoint 38 of the flight plan. This first trajectory 32 can be for example a trajectory emanating from a flight plan. Each segment 33, 34 of the first trajectory 32 of the aircraft 31 is included in a search zone 35, 36. Each search zone 35, 36 is for example rectangular and centred on the trajectory segment 33, 34 which corresponds to it. A width 37 of the search zone 35, 36 can be determined for example as a function of the manoeuvrability of the aircraft 31 or as a function of an uncertainty in the exact position of the aircraft 31 with respect to the first trajectory 32. In the case where the first trajectory 32 emanates from an angle or an approach procedure for example, the first trajectory 32 can comprise a single segment, for example the first segment 34. In this case, a single search zone will be constructed: the first search zone 35 for example.

The construction of search zones for altitudes encompassing the first trajectory 32 makes it possible to obtain a sufficient representation of the terrain along the first trajectory 32, even when the aircraft 31 deviates slightly from its first trajectory 32.

Figure 3:
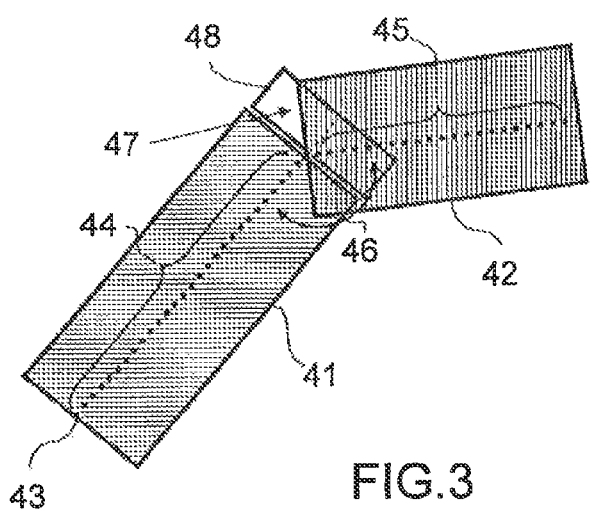
FIG. 3: an example of overlap of a dead angle between two search zones.

FIG. 3 represents an exemplary construction of search zones 41, 42. A second search zone 41 and a third search zone 42 are constructed notably by the search zones constructor 13 represented in FIG. 1a. The second and third search zones 41, 42 are for example constructed on the basis of a second trajectory 43 comprising notably two consecutive segments 44, 45. The two segments 44, 45 form an angle 46. The angle 46 is sufficiently closed such that, having regard to the widths of the second and third search zones 41, 42, there exists a dead angle 47 at the intersection between the second and third search zones 41, 42. A dead angle is a terrain portion situated for example at a distance of less than half a search zone width from the second trajectory 43, the terrain portion not being covered by the second and third search zones 41, 42. In order to cover the dead angle 47, it is possible to construct an extension 48 to the second search zone 41. The extension 48 can be of the same width as the second search zone 41. The length of the extension 48 can be calculated notably as a function of the width of the third search zone 42, of the width of the second search zone 41 and of the angle 46 between the second and third search zones 41, 42.

This method makes it possible to explore the terrain data around the second trajectory 43 without leaving any dead angle.

Figure 4A:
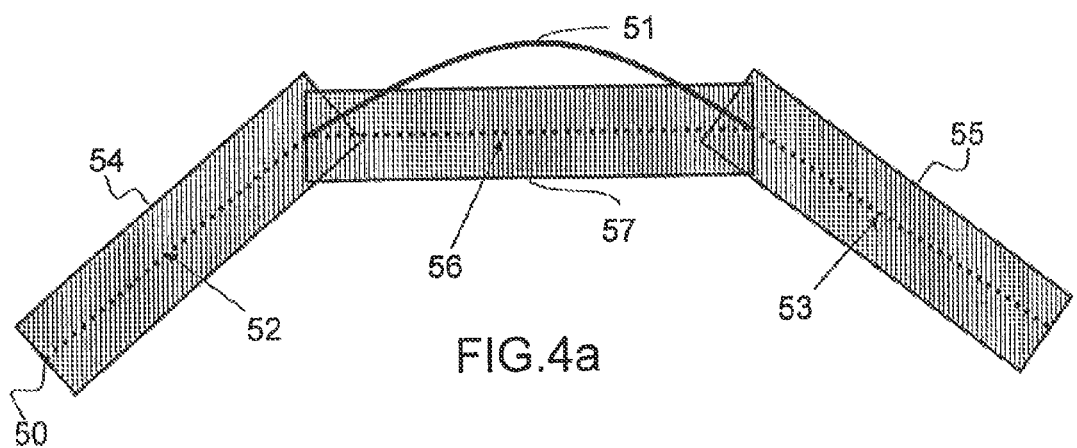
FIG. 4a: a first example of a search zone associated with a curve of a trajectory of an aircraft.
Figure 4B:
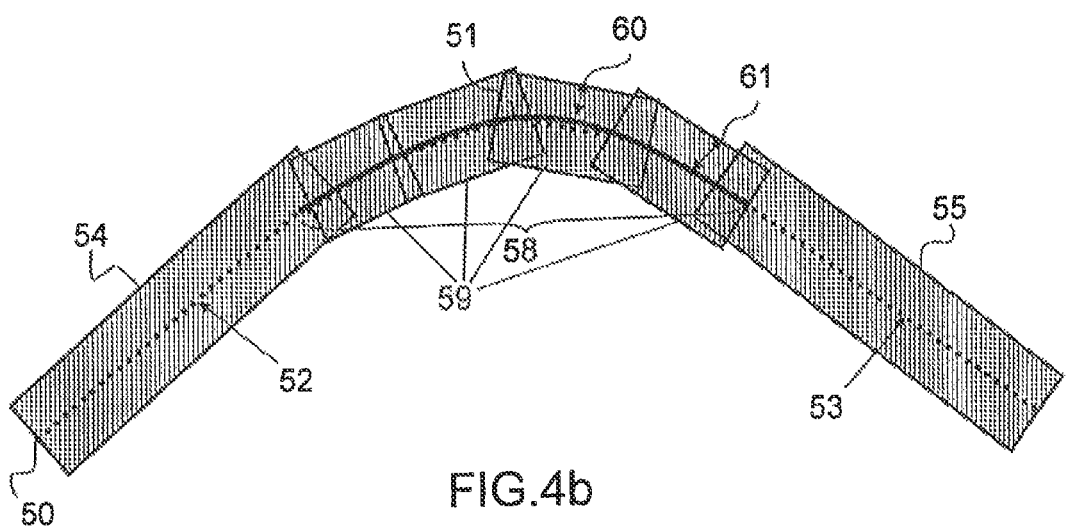
FIG. 4b: a second example of a search zone associated with a curve of the trajectory of the aircraft.

FIGS. 4a and 4b represent examples of constructing search zones on the basis of a third trajectory 50 comprising a circular arc 51, a second segment 52 and a third segment 53. The second segment 52 is for example linked to the circular arc 51, itself linked to the third segment 53. The second and third segments 52, 53 form part respectively of a fourth and of a fifth search zone 54, 55.

FIG. 4a represents a first example in which the circular arc 51 is approximated by a fourth segment 56. A sixth search zone 57 is constructed on the basis of the fourth segment 56 as described previously. The sixth search zone 57 is notably rectangular and centred on the fourth segment 56. The circular arc 51 of the third trajectory 50 is not in this case included in the sixth search zone 57. The third trajectory 50 is then not entirely covered by search zones.

In order to alleviate this problem, FIG. 4b represents a second example in which the circular arc is approximated by a set of segments 58. A set of search zones 59 is constructed on the basis of the set of segments 58 as described previously. A minimum margin 60 is the minimum distance between the circular arc 51 and the edge external to the circular arc 51 of one of the search zones of the set of search zones 59. A total margin 61 is a maximum distance between the circular arc 51 and the edge external to the circular arc 51 of one of the search zones of the set of search zones 59. The segments of the set of segments 59 are for example constructed in such a way that the ratio of the minimum margin 60 to the total margin 61 always remains in a defined ratio k. k is called the proportion of the margin to be preserved. On the basis of k, it is possible for example to calculate a maximum angle of curve $d\alpha$, to be approximated by segments, such that: $d\alpha = 2\operatorname{Arccos}(1-(1-k)M/R)$, M being the width of a search zone of the set of search zones 59, and R being the radius of the circular arc 51. The circular arc 51 is then replaced with as many segments as is necessary to comply with $d\alpha$. This approximation process makes it possible to entirely cover the circular arc 51 of the third trajectory 50 by a set of search zones 59.

Figure 5A:
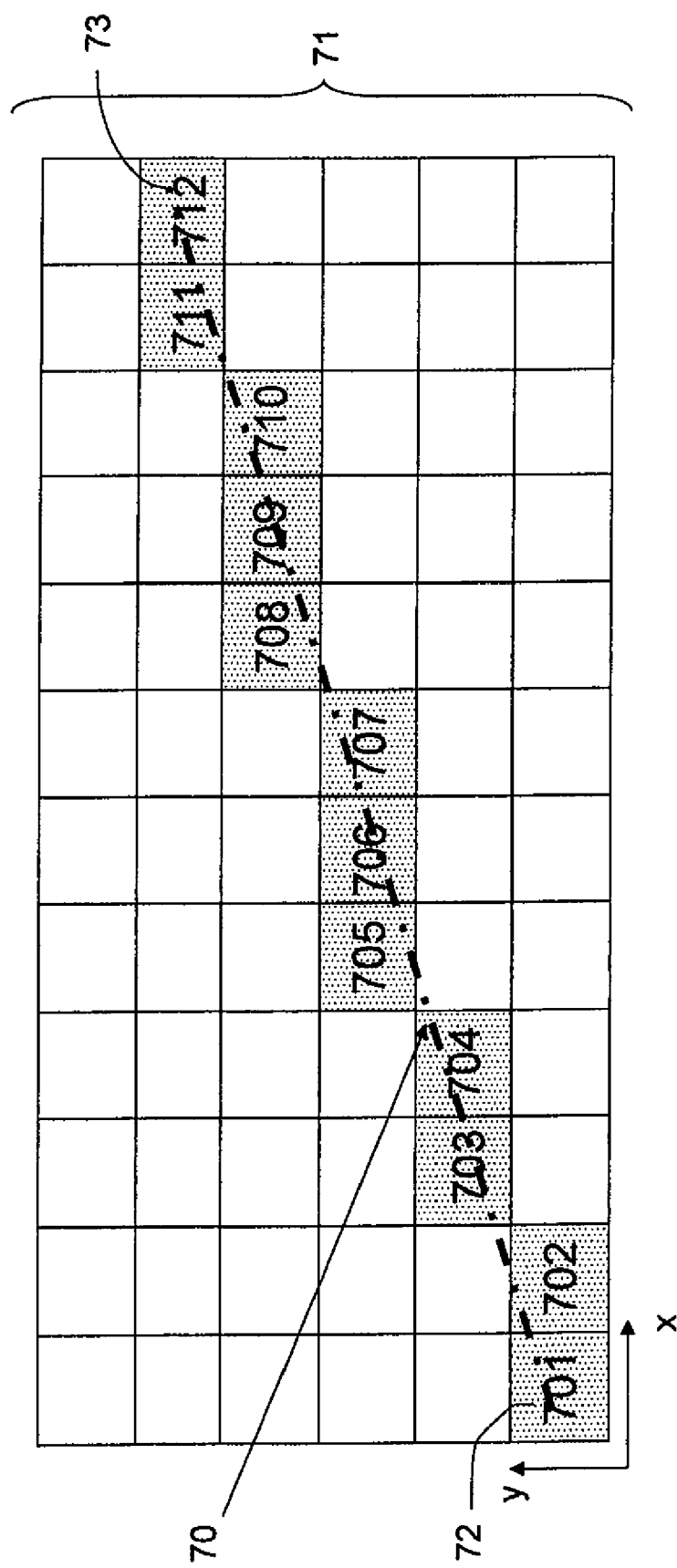
FIG. 5a: an exemplary approximation of a line by cells of a grid.
Figure 5B:
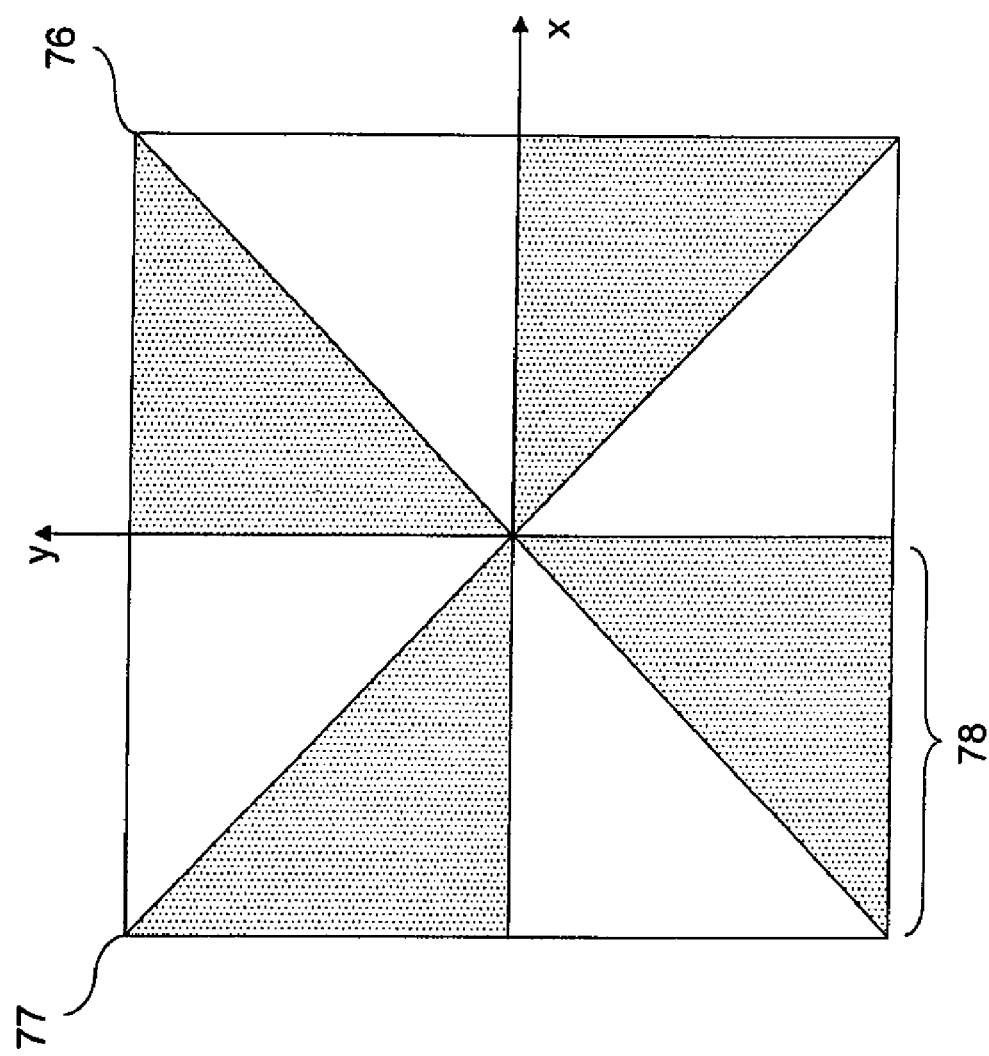
FIG. 5b: a slicing of a plane into eight sectors.
Figure 5C:
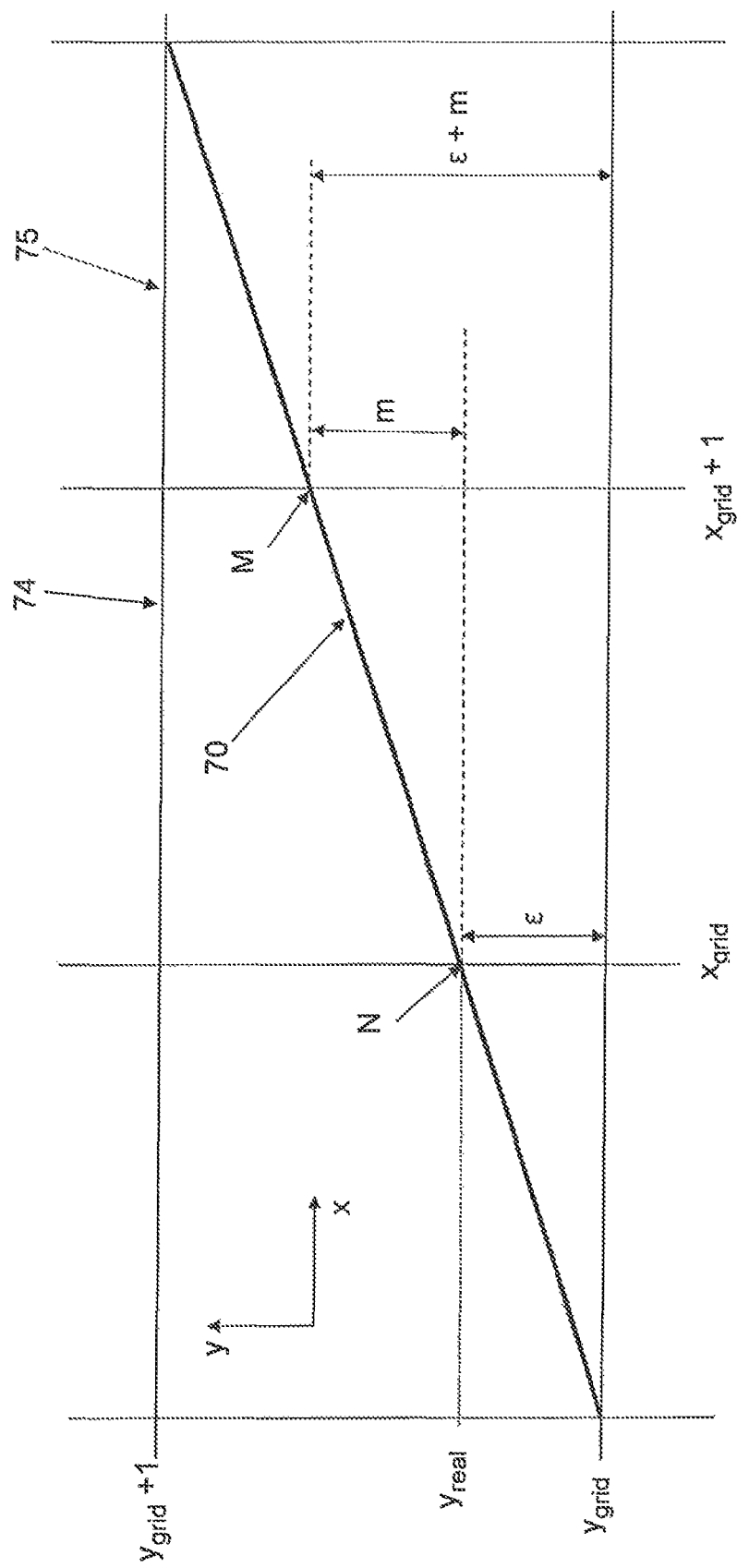
FIG. 5c: an exemplary incrementation in a traversal of the cells of the grid.

FIGS. 5a, 5b and 5c illustrate a process for sweeping the cells of a grid of cells. This process is generally used in order to plot a fifth segment 70 on a grid 71 divided into square cells for example. This sweeping process can be used by the method for selecting cells of a map of terrain data 30 belonging to a search zone. This sweeping process is implemented notably by the terrain data manager 15.

An algorithm for plotting the fifth segment 70 on the grid 71, using the grid sweeping process, makes it possible to discretize the fifth segment 70 on the grid 71. This type of algorithm is notably used to display a line on a screen divided into pixels for example. The objective of such an algorithm is to identify the cells of the grid to be used so as to provide a good approximation of the fifth segment 70 on the grid 71.

The algorithm for plotting the fifth segment 70 on the grid 71 determines in an incremental manner the cells of the grid 71 to be explored starting from a first point 72 of the fifth segment 70 up to a last point 73 of the fifth segment 70. The exploration is performed as a function notably of a plane sector in which the direction vector of the fifth segment 70 is situated.

FIG. 5b represents a slicing into eight sectors of a plane oriented along two axes x, y: the horizontal axis x and the vertical axis y for example. The two axes x, y cut one another perpendicularly thus splitting the plane up into four sectors. The four sectors can thereafter each be split up into two equal sectors by two bisectors 76, 77 cutting one another at the intersection of the two axes x, y. The plane is thus divided into eight sectors.

When the fifth segment 70 is traversed from the first point 72 to the last point 73, following the sector of the plane in which the direction vector of the fifth segment 70 is situated, from among the eight sectors, the variation in one coordinate in the plane is greater than the variation in the other coordinate in the plane. For example in FIG. 5a, when moving over the fifth segment 70 the variation in x coordinate is bigger than the variation in y coordinates. This property can be used to define a direction of iteration in the traversal of the cells: at each iteration of the algorithm for plotting the fifth segment 70 on the grid 71 we move over the grid 71 for example by a cell in the direction of the largest variation in coordinates. In FIG. 5a, the direction of the horizontal axis x is the favoured direction for example. A displacement in the direction orthogonal to the direction of larger variation in coordinates is performed each time that an aggregated discretization error exceeds a fixed threshold for example. In the example of FIG. 5a, an incrementation of the direction of the vertical axis y is therefore not systematic.

FIG. 5c represents an exemplary calculation of the direction of incrementation of the process for sweeping the grid 71. It is possible for example to identify a first cell 74 of the grid 71 by coordinates ($X_{grid}$, $Y_{grid}$) of its lower left corner:

$x_{grid}$ can represent the abscissa of the lower left corner of the first cell 74 along a horizontal axis x;

$y_{grid}$ can represent the ordinate of the lower left corner of the first cell 74 along a vertical axis y.

If in the course of a previous iteration of the process for sweeping the grid 71, the first cell 74 is associated with a point N of the fifth segment 70, the real value of the abscissa of the point N is $Y_{real} = Y_{grid} + \epsilon$, $\epsilon$ then being the error made in the vertical axis y by the discretization. At the following iteration of the algorithm, the displacement being performed for example along the horizontal direction x, the coordinates of a second cell 75 chosen on the grid are for example ($x_{grid}+1$, $y_{grid}$). The abscissa of a point M associated with the second cell 75 on the fifth segment 70 is then $Y'_{real} = Y_{grid} + \epsilon + m$, where m is the direction coefficient of the fifth segment 70. A displacement in the vertical direction y in the course of an iteration of the algorithm can be performed as soon as the difference between the real abscissa of the point associated with the current cell visited by the algorithm and the abscissa of the current cell visited by the algorithm exceeds a threshold which can be fixed at 0.5 for example. Stated otherwise, if $\epsilon+m>0.5$ then the next displacement is performed along the vertical axis y.

This algorithm can be optimized using the Bresenham algorithm described notably by Jack E. Bresenham, in Algorithm for Computer Control of a Digital Plotter, IBM Systems Journal, 4(1): 25-30, 1965.

The Bresenham algorithm uses the algorithm for plotting segments on a grid by performing notably much faster integer operations than operations on rational numbers. The condition for incrementation in the direction of the vertical axis y is for example:

$$\epsilon + m > 0.5 \tag{100}$$

If $\Delta x$ and $\Delta y$ are respectively the differences in abscissa and in ordinate between the first point 72 and the last point 73 of the fifth segment 70, then:

$$m = \Delta y / \Delta x \tag{101}$$

and therefore (100) becomes:

$$\epsilon + (\Delta y / \Delta x) > 0.5 \tag{102}$$

hence $$2\epsilon \Delta x + 2\Delta y > \Delta x \tag{103}$$

Let $\epsilon'$ be the integer closest to $\epsilon \Delta x$, then on the basis of relation (103), the following relation is obtained:

$$2(\epsilon' + \Delta y) > \Delta x \tag{104}$$

Each side of the inequality (104) is then an integer.

By proceeding thus with all the operations performed by the process for sweeping the cells of a grid, a sweeping process that is inexpensive in terms of data processing time is obtained.

By using a slicing of the plane of the grid 71 into eight sectors, as represented in FIG. 5b all the possible slopes m of a segment of a trajectory can be processed. Specifically, by using the symmetry properties of such a slicing of the plane, it is possible to reduce to the algorithm described previously by performing symmetry operations with respect to the axes x, y or with respect to the bisectors 76, 77. For example if a direction vector is taken in the left part of the plane 78, that is to say the part of the negative abscissae, it is possible to reduce to the algorithm by reversing the direction in which the cells are swept. In the same manner, when $|\Delta y|>|\Delta x|$, it is possible to interchange the role of the abscissae with the role of the ordinates in the segment plotting algorithm so as to reduce to the algorithm described. Finally, when the slope of the direction vector is negative, it suffices to change the sign of the increment to reduce to the algorithm described.

Figure 6:
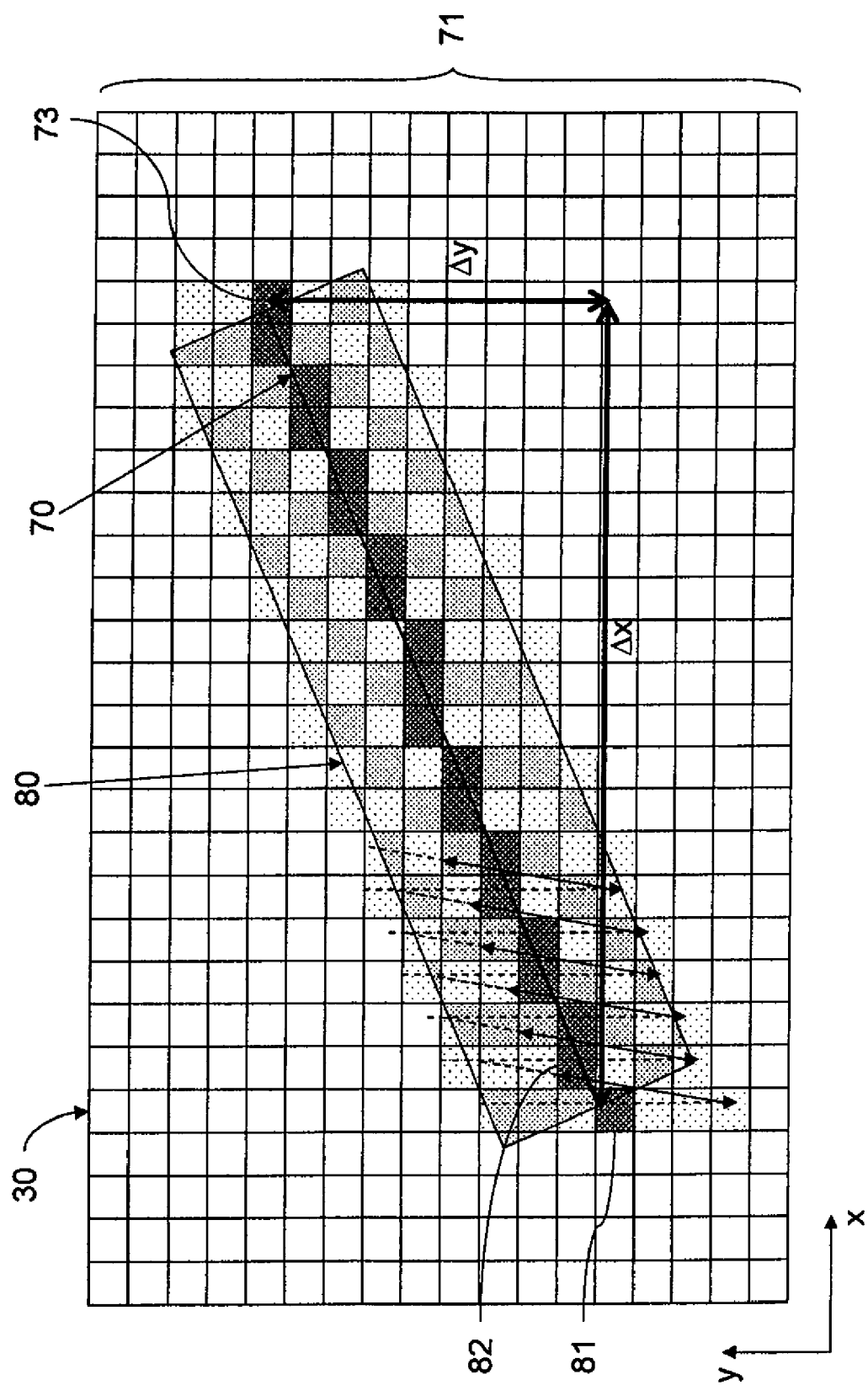
FIG. 6: an exemplary sweep of cells in a search zone.

FIG. 6 represents a process for sweeping the cells of the terrain altitude data map 30 performed notably by the terrain data manager 15. For the example, the fifth segment 70 of the third trajectory 50 covered by a seventh search zone 80 is used.

In order to determine a set of terrain data cells included in the seventh search zone 80, a sweep of the cells of the altitude data map 30 is performed. The sweep performed relies on the Bresenham algorithm as described previously.

At each incrementation of the sweeping process, the altitude of the cell directly under the segment is determined together with that of a certain number of adjacent cells in the same row or column as a function of the inclination of the fifth segment 70 so as to ascertain the altitude of all the terrain cells situated under the seventh search zone 80. The number of cells to be visited, on either side of a skeleton composed of the cells approximating the fifth segment 70, is calculated notably as a function of the inclination of the fifth segment 70 and of the width of the seventh search zone 80.

For example, in FIG. 6, the cells are swept vertically starting from a third cell 81 situated under the fifth segment 70, on either side of the third cell 81. Specifically, in the case represented in FIG. 6, $\Delta x$ is greater than $\Delta y$, the sweep is therefore performed vertically. Thereafter the algorithm performs an incrementation along the fifth segment 70 as described previously, using for example the Bresenham algorithm. The algorithm therefore arrives on a fourth cell 82 forming part of the skeleton like the third cell 81. The altitude of the fourth cell 82 is extracted then the neighbouring cells on a vertical axis are thereafter visited so as to extract their altitude. The sweep continues thus up to the last point 73 of the fifth segment 70.

If Δy is greater than Δx, the sweep of the cells on either side of the skeleton is then performed in the horizontal direction.

In order not to sweep any cell not belonging to the seventh search zone 80, it is possible to put in place a filtering of the cells visited. For example, it is possible to exclude from the sweep cells whose orthogonal projection onto a straight line passing through the fifth segment 70 does not belong to the fifth segment 70.

Figure 7:
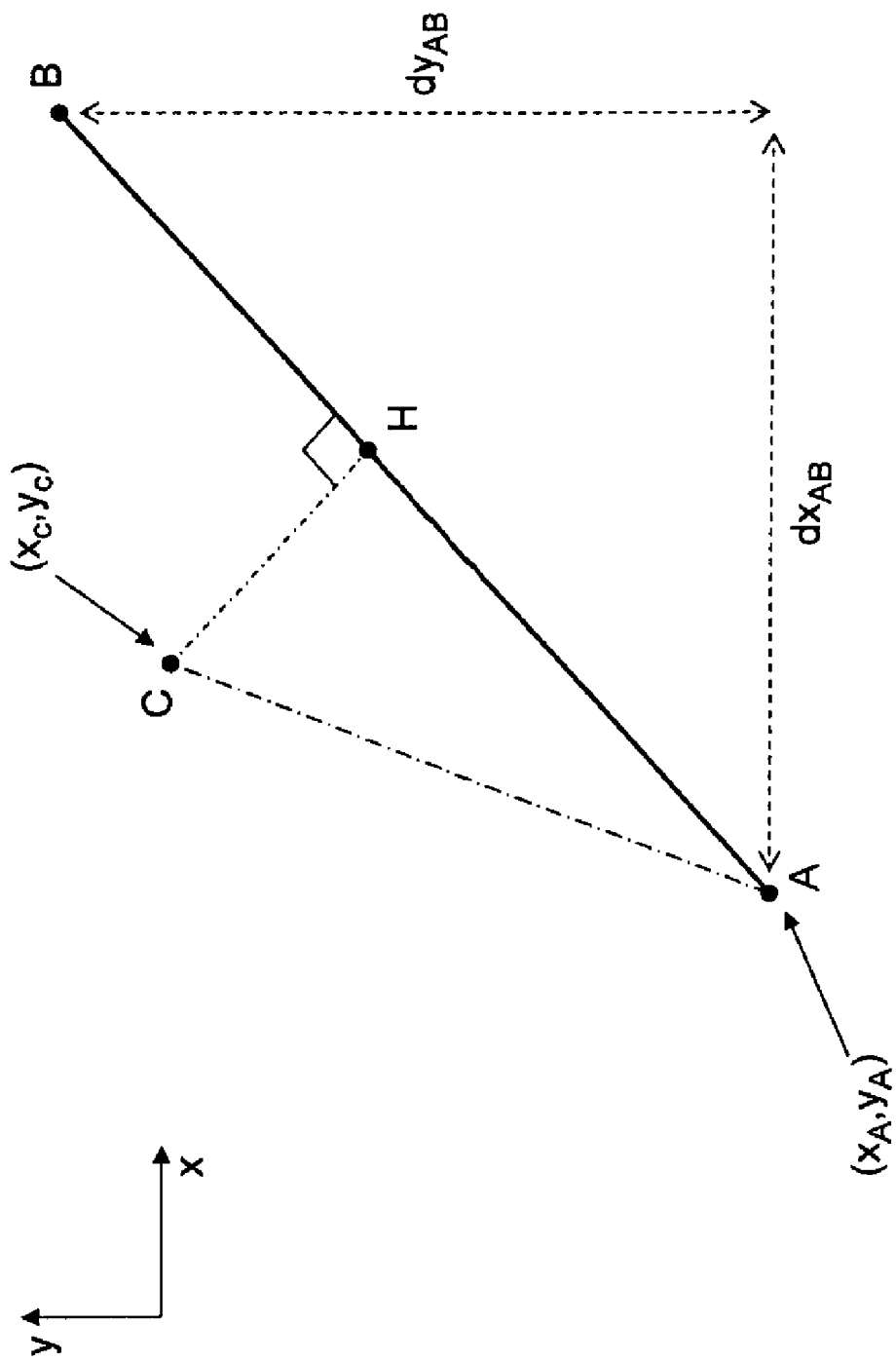
FIG. 7: an orthogonal projection of a cell onto a straight line passing through a segment of the trajectory of the aircraft.

FIG. 7 represents an exemplary filtering of cells not belonging to the seventh search zone 80 for example. The filtering can be performed by the terrain data manager 15.

Each cell is for example identified by a point C situated in the lower left corner of the cell. The coordinates of the point C in a plane defined by the horizontal axis x and the vertical axis y are $(x_c, y_c)$. The segment [A,B] is a segment of a fourth trajectory of the aircraft. For each cell of the grid 71 swept, an orthogonal projection of the point C of the cell onto the segment [A,B] is carried out. The orthogonal projection results in a point H situated on a straight line passing through the segment [A,B]. Thereafter the ratio AH/AB is calculated by computing the scalar product of the vector AC with coordinates $(x-x_A, y-y_A)$ and the vector AB with coordinates $(dx_{AB}, dy_{AB})$ in the (x, y) plane. The following relation is then obtained:

$$AH/AB=((x-x_A) \times dx_{AB}+(y-y_A) \times dy_{AB})/(dx_{AB}^2+dy_{AB}^2) \quad (105)$$

If the ratio AH/AB is included in the interval [0;1], the cell is then considered to be in the search zone relating to the segment [A,B]. The cells not meeting this criterion are not retained for the extraction of the altitudes of the search zone corresponding to the segment [A,B].

The ratio AH/AB can also make it possible to group the cells belonging to the search zone into slices. To each slice there corresponds for example an index calculated by taking the integer value of the ratio AH/AB multiplied by the total number of slices on the fourth trajectory.

Once the slice of the cell is known, the altitude of the cell is compared with a previously identified maximum altitude for the slice. If no maximum has been found previously, the altitude of the cell becomes the maximum altitude of the slice. If the altitude of the cell is greater than the maximum altitude of the slice, the altitude of the cell then becomes the maximum altitude of the slice.

The calculated index of each slice is cumulative when going from one segment to another of the fourth trajectory of the aircraft.

Thus for each slice of each search zone relating to the fourth trajectory of the aircraft there is a maximum altitude of the relief for the slice.

Figure 8A:
FIG. 8a: an exemplary calculation of altitude maximum over a terrain using the method according to the invention.
Figure 8B:
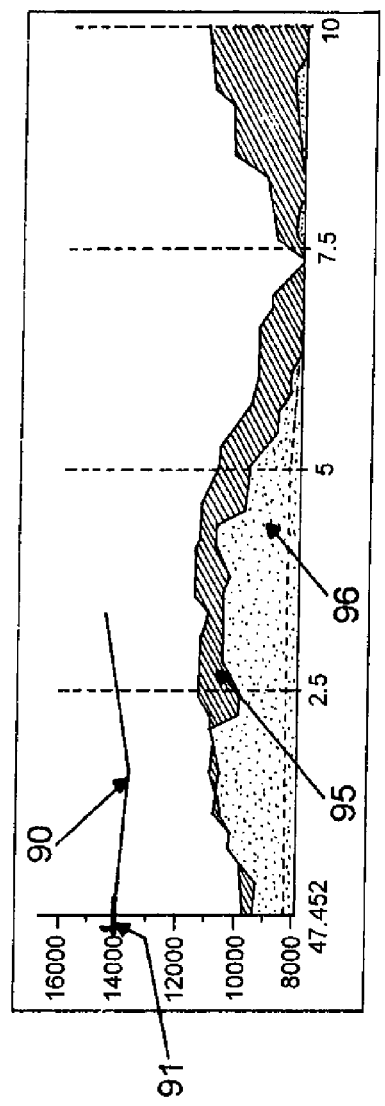
FIG. 8b: an exemplary representation of a sectional view of the terrain and of the trajectory of the aircraft.

FIGS. 8a and 8b present the results of calculating altitude maxima such as described previously. A sixth trajectory 90 of an aircraft 91, represented in FIG. 8a, comprises segments making it possible to construct a set of search zones 92 as described previously. For each zone of the set of search zones 92, a set of altitude maxima has been found. For example, for a ninth search zone 93, a set of altitude maxima 94 has been identified. The set of altitude maxima 94 is used to construct a profile of altitude maxima 95 along the sixth trajectory 90, as represented in FIG. 8b. The profile of altitude maxima 95 is constructed in a graphical manner by using as abscissa the index of the slice corresponding to each maximum altitude and as ordinate the value of the maximum altitude. A lateral view of the sixth trajectory 90 of the aircraft 91 is overlaid on the profile of altitude maxima 95 so as to allow a pilot of the aircraft 91 to assess the relief of the terrain under the trajectory 90 of the aircraft 91. A profile of the altitudes of the terrain 96 along the trajectory 90 of the aircraft 91 can also be overlaid on the profile of altitude maxima 95.

Display is carried out while applying corrections that are necessary to ensure consistency of the altitudes of the trajectory and the altitudes of the terrain which are not generally expressed in one and the same frame of reference. For example, the altitudes of the terrain can be expressed with respect to sea level, and the altitudes of the trajectory can be expressed with respect to an altitude-pressure frame of reference. It is then possible, for example, to express the altitudes of the trajectory with respect to sea level.

In another realization, it is possible to use the device and the method according to the invention to obtain the maxima of terrain altitudes along a trajectory for a trajectory correction calculation for example.

A flight plan verification tool, dubbed Flight Plan Check, can also use terrain altitude maxima provided by the device according to the invention. The Flight Plan Check is a device whose main function is to detect and to present to a crew of an aircraft any conflict of positioning of the trajectory of the aircraft with dangerous external elements such as the terrain. To this end, the Flight Plan Check compares the aircraft's vertical trajectory described in the flight plan with a profile of elements that might generate conflicts along the lateral trajectory of the aircraft. The lateral trajectory can be a flight trajectory calculated by a flight management system called the FM, the initials standing for Flight Management. The lateral trajectory can also be a trajectory described by the current position of the aircraft and its current heading that are provided by a GPS system for example. The profile of elements can be notably a terrain elevation or safety altitudes profile emanating from the device according to the invention.

Advantageously, the terrain data cell sweeping process used by the method according to the invention makes it possible to carry out an extraction of a profile of maximum altitudes along a trajectory in an optimized manner. Specifically, only the useful cells are swept, including in the case where the segments are neither horizontal nor vertical. Moreover the sweep is performed in a single pass of the Bresenham algorithm, thereby making it possible to obtain a low calculation time.

Generally, the method and the device for extracting terrain altitudes advantageously make it possible to avoid the extraction of altitudes on terrain portions where they have already been extracted.

The device according to the invention advantageously makes it possible to ensure consistency between the profile of terrain altitude maxima and the data provided by the TAWS. This makes it possible to present consolidated altitude data to a pilot of the aircraft.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A device for extracting terrain altitudes along a trajectory of an aircraft in flight, comprising:
   an interface taking into account selected flight parameters of the aircraft;
   a terrain altitudes extraction requests manager,
   constructing, on request, a trajectory of the aircraft on the basis of the flight parameters selected;

a zones manager
constructing one or more geographical zones along the trajectory of the aircraft, the geographical zones covering the trajectory,
correcting terrain altitudes extracted on the basis of terrain altitudes originating from external systems,
constructing a profile of maximum altitudes along the trajectory;
a terrain data manager
extracting terrain altitudes from a terrain database in the geographical zones constructed by the zones manager,
determining terrain altitude maxima along the trajectory; and
a terrain profile provider shaping a profile of the altitude maxima that is provided to external applications.

2. The device as claimed in claim 1, wherein the terrain data manager is configured to extract the terrain altitudes from a terrain altitude data map stored in the terrain database, said terrain altitude data map being split up into several cells, the cells being grouped into one or more slices of cells distributed along the trajectory.

3. The device as claimed in claim 2, wherein the terrain data manager is configured to extract terrain altitudes of each cell belonging to each zone, and to determine a maximum altitude per slice of cells.

4. The device as claim in claim 1, wherein the requests manager takes into account terrain altitude extraction requests coming from a user.

5. The device as claimed in claim 1, wherein the requests manager takes into account terrain altitude extraction requests coming from an external system.

6. The device as claimed in claim 1, wherein the requests manager is configured to delete from the trajectory the portions of trajectories that are obsolete with respect to a current position of the aircraft along the trajectory.

7. The device as claimed in claim 1, wherein the request manager is configured to use already calculated portions of profile of the altitude maxima.

8. The device as claimed in claim 1, wherein the request manager takes into account valid flight parameters to construct the trajectory.

9. The device as claimed in claim 1, wherein the geographical zones constructed by the zones manager are of parallelepipedal form.

10. The device according as claimed in claim 1, wherein the geographical zones constructed by the zones manager are rectangular and centred on the trajectory.

11. The device as claimed in claim 1, wherein the request manager constructs the trajectory on the basis of flight parameters present in a flight plan.

12. The device as claimed in claim 1, wherein an external application is a display.

13. The device as claimed in claim 1, wherein an external application is a function for verifying interference between the trajectory and the profile of the altitude maxima.

14. The device as claimed in claim 1, wherein the requests manager is configured to construct the trajectory on the basis of a segment comprising an origin, an orientation and a length.

15. A method for extracting terrain altitudes along a trajectory of an aircraft in flight, said method comprising at least the following steps:
selecting flight parameters;
recovering the flight parameters selected;
constructing the trajectory of the aircraft with the flight parameters selected;
constructing one or more geographical zones along the trajectory of the aircraft, the geographical zones covering the trajectory;
identifying cells of an altitude data map of the terrain belonging to each zone;
extracting the altitudes of the terrain of the identified cells of a zone, for each zone;
grouping the identified cells belonging to a zone into several slices of cells;
determining a maximum altitude per slice of cells;
composing a profile of the determined altitude maxima along the trajectory;
correcting the profile of the altitude maxima with altitude data emanating from one or more external systems.

16. The method as claimed in claim 15, wherein the trajectory portions that are obsolete with respect to a current position of the aircraft are deleted from the trajectory taken into account for the construction of geographical zones.

17. The method as claimed in claim 15, wherein the already calculated portions of the profile of the altitude maxima are not recalculated following a modification of the trajectory.

18. The method as claimed in claim 15, wherein it being possible for several trajectories to be taken into account, only valid trajectories are taken into account.

19. The method as claimed in claim 15, wherein the geographical zones are parallelepipeds.

20. The method as claimed in claim 15, wherein the geographical zones are rectangles centred on the trajectory of the aircraft.

21. The method as claimed in claim 15, wherein the trajectory is constructed on the basis of flight parameters emanating from a flight plan.

22. The method as claimed in claim 15, wherein the trajectory is constructed on the basis of a segment defined by a position, an orientation and a length.

23. The method as claimed in claim 15, wherein the profile of the altitude maxima is displayed.

24. The method as claimed in claim 15, wherein the profile of the altitude maxima is provided to a function for verifying interference between the trajectory and the profile of the altitude maxima.

25. The method as claimed in claim 15, wherein the identification of the cells belonging to each zone uses the Bresenham algorithm.

26. A device for extracting altitudes of the terrain along a trajectory of an aircraft in flight, comprising:
a constructor of geographical zones covering the trajectory;
a manager of terrain data cells of a terrain altitude data map, the terrain data altitude map being divided into terrain data cells each comprising an altitude, the said manager of terrain data cells identifying the terrain data cells belonging to each zone and determining a maximum altitude per slice of terrain data cells;
a terrain data extractor, recovering the altitudes of the identified cells in a terrain database comprising terrain altitude data maps;
a terrain data consolidation module, making the maximum altitudes consistent with altitude data emanating from an external system;
a sliding filter, identifying the trajectory portions already traversed by the aircraft and which are no longer to be taken into account to construct the geographical zones; and
a calculated-data manager, eliminating the trajectory portions already taken into account in a zone.

* * * * *